US012487648B2

(12) United States Patent
Kim et al.

(10) Patent No.: US 12,487,648 B2
(45) Date of Patent: Dec. 2, 2025

(54) ADAPTIVE POWER CONTROL FOR AN ELECTRONIC DEVICE

(71) Applicant: Microsoft Technology Licensing, LLC, Redmond, WA (US)

(72) Inventors: Donghwi Kim, Kirkland, WA (US); Gregory Allen Nielsen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 17/691,374

(22) Filed: Mar. 10, 2022

(65) Prior Publication Data

US 2023/0315175 A1   Oct. 5, 2023

(51) Int. Cl.
*G06F 1/26* (2006.01)
*H02J 7/00* (2006.01)

(52) U.S. Cl.
CPC .............. *G06F 1/26* (2013.01); *H02J 7/0049* (2020.01); *H02J 7/0063* (2013.01); *H02J 7/00712* (2020.01); *H02J 7/007194* (2020.01)

(58) Field of Classification Search
None
See application file for complete search history.

(56) References Cited

U.S. PATENT DOCUMENTS

| 4,390,828 | A | * | 6/1983 | Converse | .......... | H02J 7/007182 |
| | | | | | | 323/278 |
| 5,778,325 | A | * | 7/1998 | Lindell | ................. | H01M 10/46 |
| | | | | | | 455/127.1 |
| 6,498,460 | B1 | | 12/2002 | Atkinson | | |
| 7,872,450 | B1 | | 1/2011 | Cohen et al. | | |
| 8,159,186 | B2 | | 4/2012 | Iida et al. | | |

(Continued)

FOREIGN PATENT DOCUMENTS

| CN | 108879747 A | 11/2018 |
| CN | 113872303 A | 12/2021 |

OTHER PUBLICATIONS

"International Search Report and Written Opinion Issued in PCT Application No. PCT/US22/051342", Mailed Date: Apr. 6, 2023, 13 Pages.

(Continued)

*Primary Examiner* — Paul Yen
(74) *Attorney, Agent, or Firm* — Holzer Patel Drennan

(57) ABSTRACT

A method of adaptively controlling the distribution of power supplied by a charger of an electronic device between an energy storage device and one or more hardware elements is provided. The method includes determining whether current communicated between the charger of the electronic device and the energy storage device satisfies a charging condition, the charging condition based on one or more of a direction of the current communicated and a magnitude of the current communicated, determining whether consumed system power consumed by the hardware elements satisfies a system power condition based on a determined system power limit, and adjusting power consumption of the one or more hardware elements of the electronic device to consume a different consumed system power within a predefined range of system power limits, based at least in part on satisfaction of the charging condition and satisfaction of the power supply condition.

25 Claims, 9 Drawing Sheets

(56) References Cited

U.S. PATENT DOCUMENTS

| | | | |
|---|---|---|---|
| 8,242,359 B2 | 8/2012 | Mcginley et al. | |
| 8,769,327 B2 | 7/2014 | Lu et al. | |
| 9,559,543 B2 | 1/2017 | Greening et al. | |
| 9,564,772 B2 | 2/2017 | Qiu et al. | |
| 10,423,202 B2* | 9/2019 | Rotem | G08B 21/182 |
| 2002/0175659 A1 | 11/2002 | Sakakibara | |
| 2016/0132065 A1* | 5/2016 | Sultenfuss | G05F 1/66 |
| | | | 700/295 |
| 2016/0149438 A1 | 5/2016 | Tseng | |
| 2016/0352114 A1* | 12/2016 | Kaji | H02J 3/32 |
| 2018/0143252 A1* | 5/2018 | Kondo | H01M 10/4285 |
| 2019/0020215 A1 | 1/2019 | Atkinson | |
| 2019/0250689 A1* | 8/2019 | Ivanov | G06F 1/3203 |
| 2020/0343759 A1* | 10/2020 | Hong | G01R 31/36 |
| 2021/0096633 A1* | 4/2021 | Rintamaeki | G05B 17/02 |

OTHER PUBLICATIONS

Kollimalla, et al., "Optimization of Charge/Discharge Rates of a Battery Using a Two-Stage Rate-Limit Control", In Journal of IEEE Transactions on Sustainable Energy, vol. 8, Issue 2, Sep. 13, 2016, pp. 516-529.

* cited by examiner

ADAPTIVE POWER CONTROL FOR AN ELECTRONIC DEVICE

BACKGROUND

Electronic devices balance power provided to system elements and energy storage devices. Power supply units (PSUs) coupled to the electronic devices to provide power to the electronic devices provide varying power depending on operating conditions. At times, even when an electronic device and a PSU are plugged in, insufficient power is supplied to the energy storage device of the electronic device to charge it, resulting in a plugged-in not charging (PINC) condition.

SUMMARY

A method of adaptively controlling the distribution of power supplied by a charger of an electronic device between an energy storage device of the electronic device and one or more hardware elements of the electronic device while the charger receives input power from an external power source is provided. The method includes determining whether current communicated between the charger of the electronic device and the energy storage device satisfies a charging condition, wherein the charging condition is based at least in part on one or more of a direction of the current communicated and a magnitude of the current communicated. The method further includes determining whether system power consumption by the hardware elements satisfies a system power condition based on a determined system power limit, wherein the determined system power limit is a limit on power to be provided to the one or more hardware elements of the electronic device. The method further includes adjusting power consumption of the one or more hardware elements of the electronic device to consume a different consumed system power within a predefined range of system power limits, based at least in part on satisfaction of the charging condition and satisfaction of the power supply condition.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
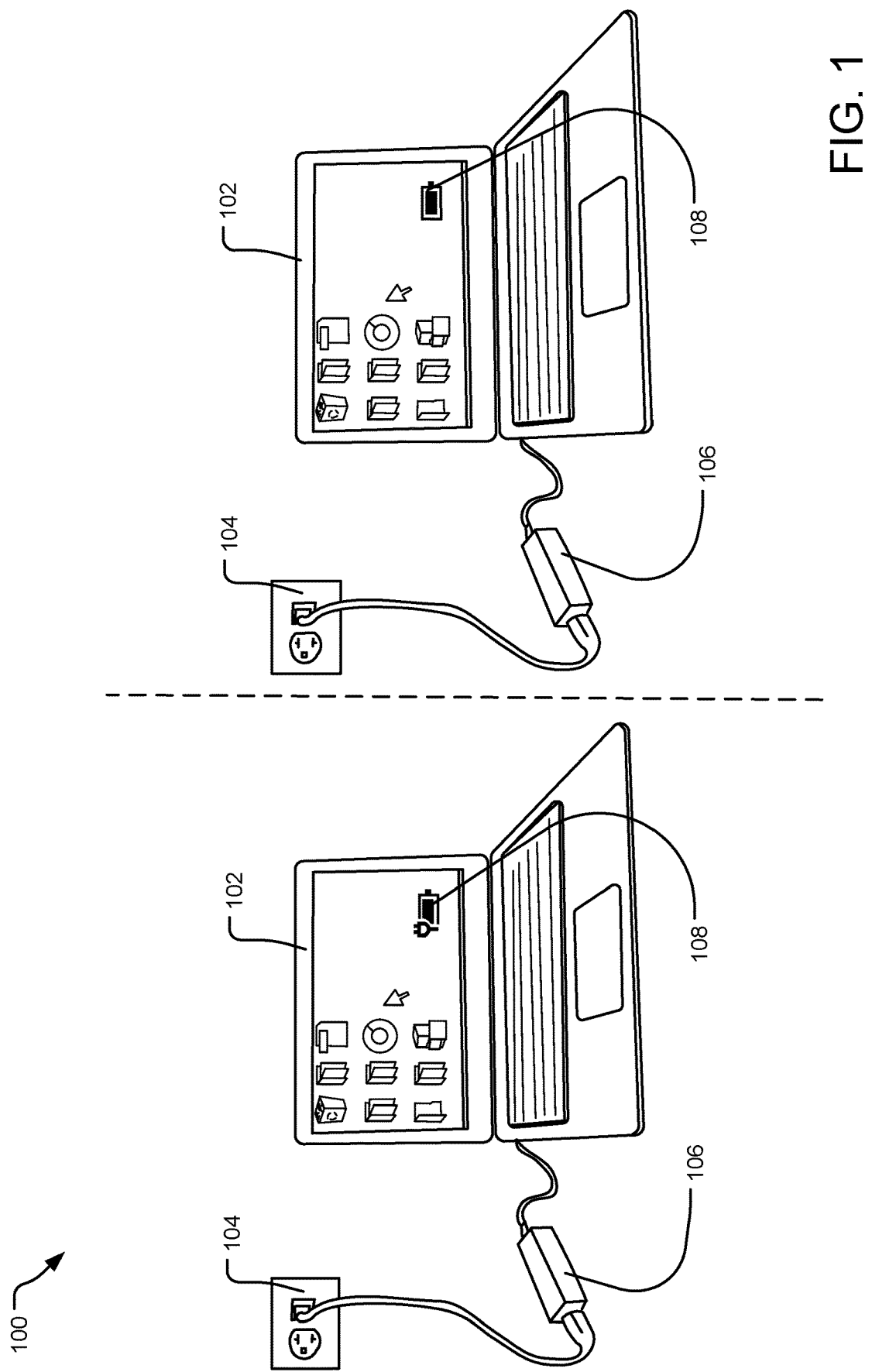
FIG. 1 illustrates an example electronic device system.

The power supplied to elements of an electronic device by a power supply unit (PSU) can vary depending on a number of conditions. These conditions potentially include temperatures of various components (e.g., electronic device surface temperatures or device skin temperatures, electronic device component temperatures, battery temperatures, or PSU temperatures), varying power supplied to and/or by the PSU, varying power consumed by electronic device hardware elements (e.g., not including an energy storage device of the electronic device), varying power provided to charge one or more energy storage devices, and/or current and/or voltage transients in the electronic device. For example, the power supplied and the voltage supplied by a PSU can vary by more than 10%, depending on ambient temperature, component manufacturing corners, and other variable conditions.

An approach to account for these varying conditions is to conservatively rate-limit the elements of the electronic device using static controls to ensure that tolerances for power supplied to the system are not violated. Static controls can be conservative to account for the potential variances anticipated. The conservative and/or static controls can unreasonably limit electronic device performance in circumstances where the limitation does not benefit the electronic device or a user thereof.

Some electronic devices include internal energy storage devices (e.g., batteries). When a PSU supplies power to an electronic device with an energy storage device, a charger component of the electronic device distributes power between system power supplied to the electronic device hardware elements (hereinafter, "hardware elements," as distinguished from the energy storage device) of the electronic device and charging power supplied to the energy storage device. In implementations, the system power supplied to the hardware elements may also include power discharged from an energy storage device (e.g., even when the energy storage device is charging). In circumstances where power supplied by the PSU is sufficiently low relative (e.g, due to nonideality of the PSU and/or other elements that deliver power in the electronic device) to the power consumed hardware elements, the energy storage device may not receive sufficient power to charge, resulting in a plugged-in not charging (PINC) condition. Systems with conservative or static tolerances for power supplied (e.g., ones that overprovision certain hardware) by a wide range of charging devices or PSUs can exacerbate this, as they may limit otherwise available power from being supplied.

The presently disclosed technology provides adaptive power control for an electronic device. Adaptive power distribution can be based on a number of conditions. For example, the adaptive control can be based on whether the system power (e.g., power other than power distributed to charge the energy storage device but including power discharging to the hardware elements from the energy storage device) provided to and/or consumed by one or more hardware elements has reached a system power limit (SPL) (e.g., a minimum load at which the power distribution becomes an issue and/or a minimum power level at which the system can or is permitted to or is specified to operate), whether power supplied to the energy storage device has satisfied a charging condition (e.g., whether a charge level or rate of charge reaches a predefined threshold or falls within a predefined range), and/or whether thermal or reliability conditions are satisfied (e.g., an electronic device element temperature satisfies a predefined threshold or falls within a predefined range). When the specification describes power measurements or limits, it may imply that the power limits and measurements may apply to power at a moment or power transmitted over time (e.g., an average of the relevant power parameter over a period of time).

By adapting to varying conditions experienced by the electronic device (e.g., variations in performance of the PSU and other components that deliver power to hardware elements of the electronic device), supplied power distribution between the system power (which may include power discharged from the energy storage device) provided to or consumed by the hardware elements of the electronic device and the charging power provided to charge the energy storage device can be improved to better account for the varying conditions. Adaptively and dynamically controlling allocation of power distribution can allow a balance between preventing or limiting PINC and allowing a user to operate the electronic device without significant limitations (e.g., under heavy processing loads). The adaptive and/or dynamic control can improve a user's experience and/or system performance.

FIG. 1 illustrates an example electronic device system 100. In the image on the left, an electronic device 102 is coupled to a PSU 106, which is plugged into an electrical outlet 104. An energy storage device charge icon 108 indicates that the electronic device 102 uses power supplied by the PSU 106 to charge an energy storage device in the electronic device 102.

In the image on the right, the electronic device 102 is also coupled to a PSU 106, which is plugged into the electrical outlet 104. However, the energy storage device charge icon 108 indicates that the electronic device 102 provides no charging power to charge the energy storage device in the electronic device 102. The PSU 106 is plugged into (e.g., electrically coupled to) the electrical outlet 104, but power is not being supplied to charge the energy storage device, indicating a plugged-in not charging (PINC) condition.

A factor that can contribute to a PINC condition is that electronic device 102 manufacturers can configure power control and/or distribution systems of the electronic device 102 to statically and/or conservatively prevent the systems of the electronic device from utilizing the full extent of power that a PSU 106 can provide. This static or conservative power control and/or distribution configuration can limit power supplied by the PSU 106 to a level lower than the amount the PSU 106 is rated to supply. Another factor that can contribute to a PINC condition is that a power control system can push the ideal limits of the system power the PSU 106 can provide to the electronic device 102, causing the hardware elements to consume system power excessively that might otherwise be distributed as charging power to charge the energy storage device. Still, another factor that can contribute to a PINC condition is a series of unknown random transient peak changes in a current or voltage when operating on a system workload, which can cause shocks to the systems of the electronic device 102 that can be difficult to anticipate and account for in advance.

The electronic device 102 may include an adaptive power control system that can manage power distributed between hardware elements and an energy storage device in the electronic device 102 responsively to varying conditions. This may reduce the likelihood of PINC conditions and/or improve user satisfaction with the performance of the electronic device 102.

Figure 2:
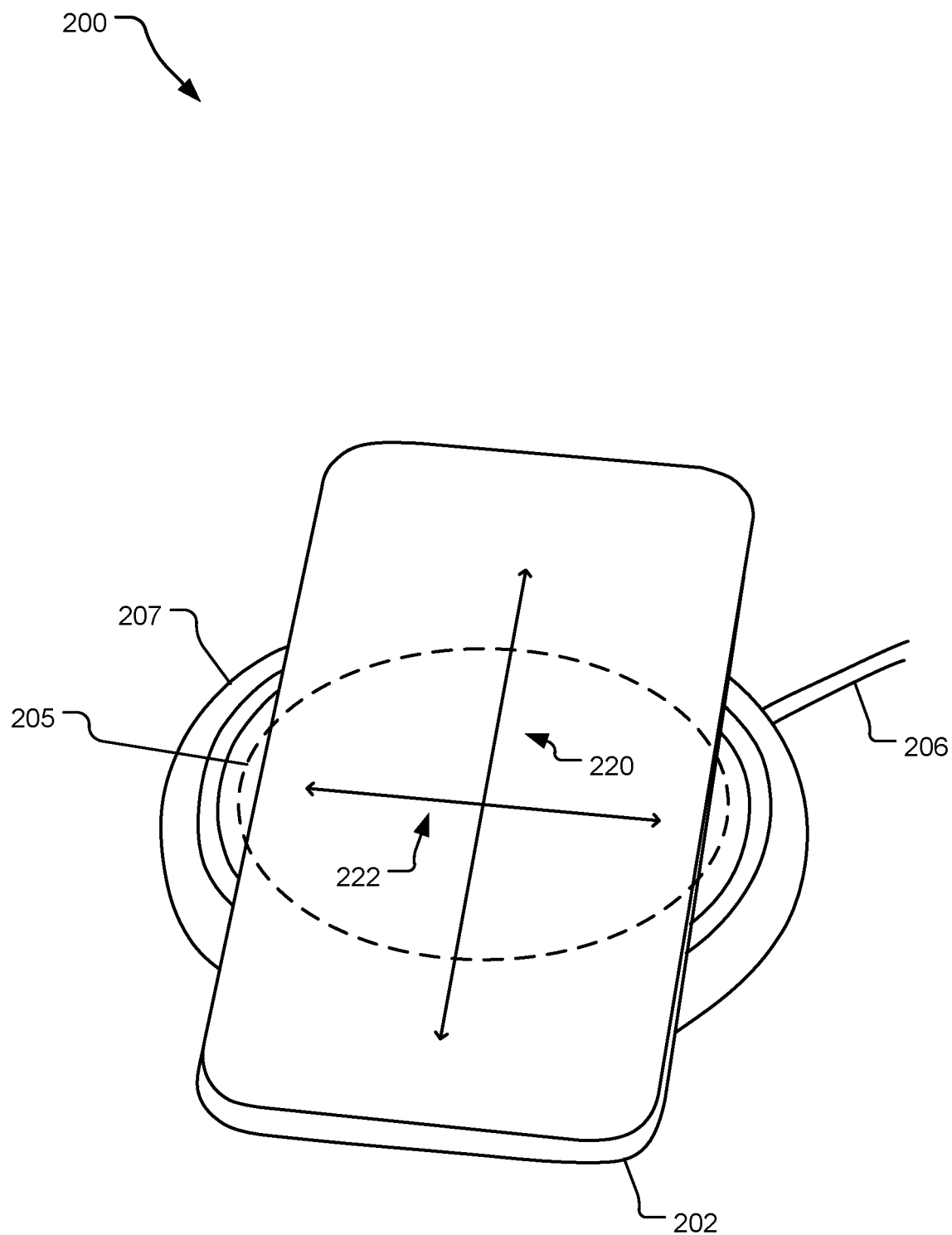
FIG. 2 illustrates an example wireless charging system for an electronic device.

FIG. 2 illustrates an example wireless charging system 200 for an electronic device. The system includes a charging transmitter device (e.g., a charging pad 207) and an electronic device 202 (e.g., a mobile phone) that receives charge from the charging pad 207. The charging pad 207 includes charging transmitter circuitry (not shown) with a charging transmitter coil 205 and is connected to a power source via a PSU 206. The charging transmitter coil 205 is capable of transferring power to a charging receiver coil (not shown) in the electronic device 202. To receive the transferred power, the charging receiver coil is positioned within a three-dimensional working volume, which is centered about the charging transmitter coil 205. The charging receiver coil of the electronic device 202 is capable of receiving power transferred from the charging transmitter coil 205 if the charging receiver coil is positioned within the three-dimensional working volume. In typical implementations, the electronic device 202 is placed upon or in proximity to the charging pad 207.

Among other factors, misaligned placement of the electronic device relative to the charging pad 207 can contribute to coil misalignment and larger-than-expected separation between the coils of the charging pad 207 and the electronic device 202. The potential misalignment is represented by the two crossing arrows 220 and 222 near the center of the charging transmitter coil 205, although misalignment can be in any direction. Furthermore, a nontrivial separation between the coils of the charging transmitter and the charging receiver (e.g., if the electronic device 202 is not placed flat upon the charging pad 207 or if a magazine is placed between the electronic device 202 and the charging pad 207) can also reduce charging efficiency.

Such misalignment and/or separation can reduce the charging efficiency between the coils and therefore reduce the power transferred to the electronic device 202. This reduction can cause PINC in electronic devices 202 lacking adaptive power control when the power consumed by system components and associated applications is relatively high, and no additional power is available to charge an energy storage device, such as a battery. However, Electronic devices 202 with adaptive power control can compensate for reduced power supplied by a wireless charger due to misalignment or other inefficiencies. Implementations are also contemplated in which the charging pad 207 or another wireless charging element additionally or alternatively includes or is an element of an adaptive power control system as described herein.

Figure 3:
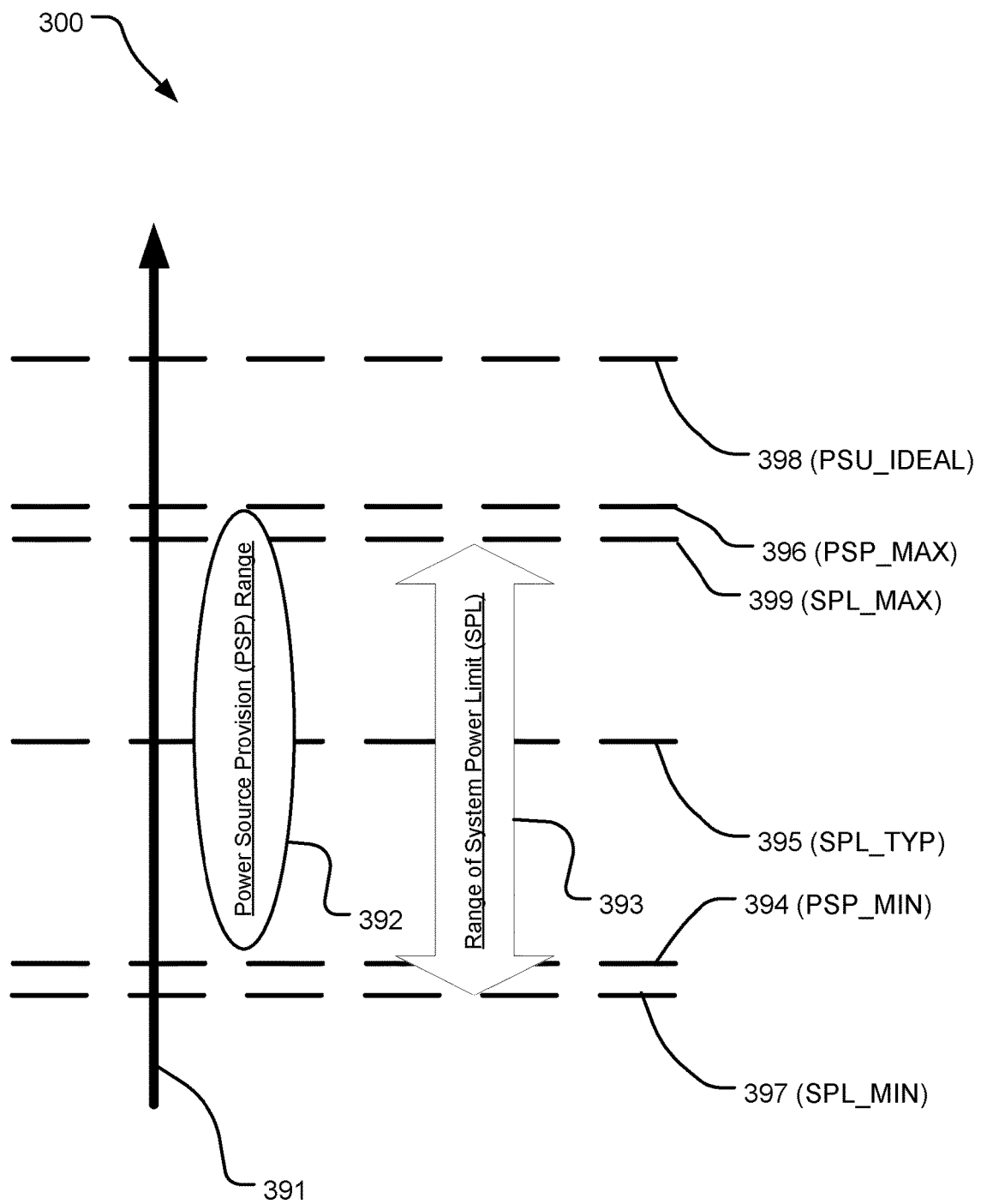
FIG. 3 illustrates an example adaptive power range chart for an electronic device and PSU.

FIG. 3 illustrates an example adaptive power range chart 300 for an electronic device and PSU. The chart includes an ordinate axis 391 representing a magnitude of power that increases in the direction of the arrow. The illustrated oval indicates a predefined electronic device power source provision (PSP) range 392 that represents a range of power deliverable to the hardware elements of the electronic device after accounting for nonideality of power delivery elements. The nonideality can be from losses in the circuitry between the PSU and the device hardware elements or from nonideal power rating variation of a PSU itself (e.g., given a nonideal ambient temperature). This nonideality is illustrated by the high end of the power source provision range PSP_MAX 396 being less than an ideal PSU power level 398 rating with no power delivery variation or loss to the electronic device. The predefined electronic device power source provision (PSP) range 392 represents the variability that exists in the supply of power from power sources (e.g., a PSU and/or an energy storage device) to the hardware elements (e.g., the system power provided to the system as opposed to charging power provided to charge an energy storage device) due to variability in one or more of the power supplied to the PSU, the PSU, a charger of the electronic device, and power delivery components that regulate voltage and current supplied to device hardware elements. The system power provided to the system may include both power provided by a PSU and power that is provided to the system from discharge of the energy storage device. The two-headed arrow indicates a predefined range or boundaries of total system power limit (SPL) 393 that acts as a limit of system power consumable by the device hardware elements (e.g., apart from charging power supplied by the PSU to charge an energy storage device). Implementations are contemplated in which the predefined electronic device hardware PSP range 392 is equal to or wider than the predefined range of SPLs.

Line 397 is a lower bound predefined system power limit (SPL_MIN) representing a lower bound for an SPL that still allows a power control system to provide charging power to charge an energy storage device within a predefined range of charge rate and to avoid PINC. Line 398 (or PSU_IDEAL) illustrates predefined ideal magnitudes of supplied power provided by the PSU to the electronic device without accounting for nonideal losses associated with delivering the power to hardware elements of the electronic device. This is typically a negotiated power rating when a PSU is plugged in. The line 394 (PSP_MIN) represents a predefined lower bound deliverable power limit or minimum power source provision (PSP_MIN) that represents the power delivery under conditions with high losses due to nonideality (e.g., accounting for a high predefined loss limit due to the circuitry between the PSU and the device hardware elements and/or a high predefined loss limit from nonideal behavior of a PSU). The line 394 is a predefined lower bound of power supplied to system hardware elements. The difference between PSP_MIN and SPL_MIN (and, similarly, the differences between PSP_MAX and SPL_MAX) may represent charging power to be provided to charge the energy storage device to prevent PINC (e.g., by maintaining a minimum charge rate of the energy storage device).

The line 396 (PSP_MAX or maximum power source provision) illustrates a predefined upper bound deliverable power limit. The upper bound deliverable power limit can be based on one or more of the maximum power deliverable from a PSU when accounting for nonideality (e.g., accounting for a low predefined loss limit in the circuitry between the PSU and the device hardware elements and/or a low predefined loss limit from nonideal behavior of a PSU) and maximum power deliverable while still satisfying reliability conditions (e.g., hardware elements need to stay below certain temperatures or below certain performance metrics). Line 399 is a predefined upper bound system power limit (SPL_MAX) for a power source of line 396 to be able to provide system power to hardware elements of the electronic device and avoid PINC. This line 399 SPL_MAX may represent a power level at which PINC does not occur while the power available to hardware elements of the electronic device is the lesser of an upper bound reliability power limit for the electronic device (e.g., a maximum power that still satisfies reliability limits or conditions) and a predefined upper bound available power after accounting for nonideality.

For example, an electronic device is plugged into an outlet with a PSU that is rated or negotiated to provide 95 Watts (W) of power. In a first warm room (e.g., a place in which the system is predefined to have low power losses), the power source capability to the electronic device hardware elements and/or the energy storage device may be only an upper bound limit of 90 W at best. The 5 W of lost power can be due to one or more of nonideal behavior from the PSU (e.g., because of temperature effects) and losses in device connections and power delivery paths that deliver power to the device hardware elements or the energy storage device. The 90 W power level may be a predefined upper bound deliverable power limit for the system. In a colder room B, another PSU may perform poorly, only allowing for power delivery of 85 W accounting variations. This 85 W level may represent a predefined lower-bound deliverable power limit for the system with the PSU. In this example, the electronic device hardware PSP range 392 would be between 85 W and 90 W, and the predefined range of SPLs 393 may be shifted lower than the PSP 392 range (e.g., between 83 W and 88 W) to leave a predefined charging power allocation. The power provided by the PSU to the electronic device charger that is not delivered to be consumed by hardware elements may be provided as charging power to charge the energy storage device. In implementations, one or more of the predefined PSP range 392 and the range of SPLs 393 may be based on specifications of the elements of the electronic device system and/or based on negotiated or contracted terms between vendors of the electronic device system components.

The line 395 illustrates an initial SPL for an electronic device when the PSU is plugged in. The initial SPL is within the predefined range of system power limits 393 (e.g., be in the middle of the predefined range of system power limits 393). The initial SPL may be a fixed value, may be a value that depends on the configuration of the PSU and hardware elements of the electronic device, or may be adaptively updated based on a predetermined or learned (e.g., using a machine learning algorithm) SPL (e.g., determined or learned in a prior session before an electronic device reboot).

PINC can occur in systems when system power is allocated at a level higher than the system PSU can provide when accounting for nonideality. For example, when a system power consumed by hardware elements is greater than a sum of a power deliverable by a power delivery system to the hardware elements and power that the PSU can provide, PINC may occur. When system power consumed by the electronic device hardware elements reaches the SPL_MAX 399, some of that PSU residual power (e.g., power represented by a difference between SPL_MAX 399 and PSP_MAX 396) may be available for charging an energy storage device and may help to prevent PINC. A power control system can adjust the SPL adaptively in the predefined range of system power limits 393 to cause more charging power to be supplied to charge the energy storage device. This dynamicity in SPLs can limit PINC.

Figure 4:
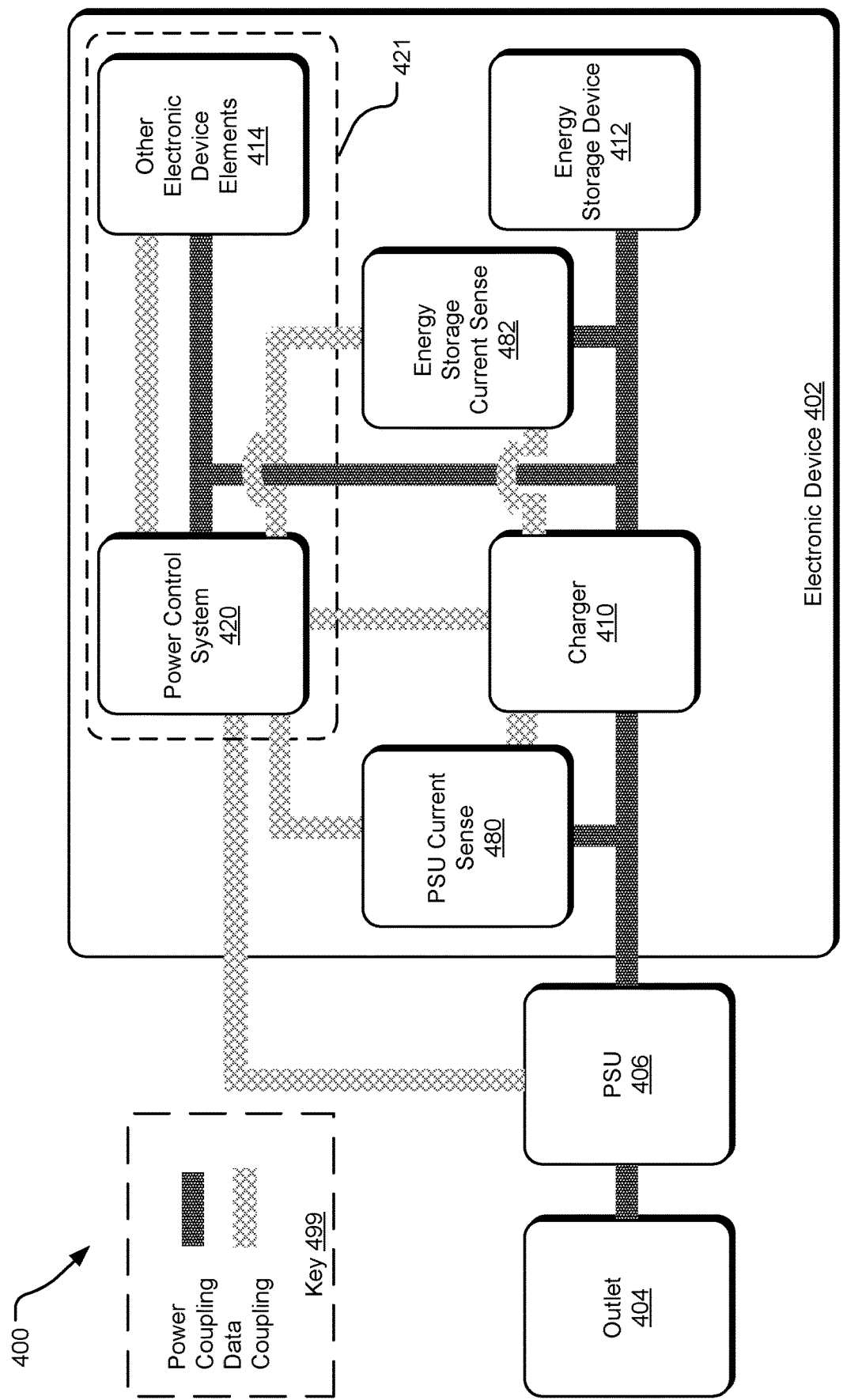
FIG. 4 illustrates an example electronic device system with adaptive power control.

FIG. 4 illustrates an example electronic device system 400 with adaptive power control. In the illustrated example, a key 499 is provided to distinguish between the illustrated power couplings and data couplings. While illustrated as direct couplings, implementations are contemplated in which the couplings illustrated are indirect and/or through other components which may or may not be illustrated. The electronic device 402 is electrically coupled to an outlet 404 using a PSU 406.

In the electronic device system 400, a power control system 420 adaptively determines whether to modify a system power limit (SPL) by power control system 420. The SPL may at least partially determine how power is distributed between system power provided to hardware elements 421 that consume power and charging power supplied to charge the energy storage device 412. Implementations are contemplated in which the electronic device 402 includes more than one energy storage device 412 (even if only one is described for the purposes of brevity), and charging power may be distributed between the more than one energy storage device 412 in a predefined manner. The adaptive determinations are based at least in part on power system data exchanged between the power control system 420 and components of the electronic device 402. In various implementations, the power control system 420 includes one or more of dedicated hardware elements and dedicated software elements (e.g., a power control system module) dedicated to controlling power distribution to and/or within the electronic device 402.

The hardware elements 421 illustrated include the power control system 420 and other electronic device elements 414. In various implementations, one or more of the power control system 420 and the other electronic device elements 414 can include a processing system (e.g., a central processing unit, a graphics processing unit, and an application-specific integrated circuit), a memory system, a communication interface system (e.g., for communicative and/or electric coupling with external devices), embedded controllers, system management frameworks (e.g., ones specifically for power control), a display system, an indicator system, a cooling system, an audio system, and the like (see, e.g., components of the computing device 900).

In implementations, the power system data exchanged with the power control system 420 include PSU-specific data to identify one or more properties of PSU 406 and/or The PSU-specific data is provided to the power control system 420 over a data coupling between the PSU 406 and the power control system 420. In implementations, PSU-specific data parameters may include one or more of voltage specifications of the PSU 406, current specifications of the PSU 406 (e.g., a current limit), power specifications of the PSU 406, model numbers of the PSU 406 and/or its constituent elements, and safety limits (e.g., temperature limits) of the PSU 406. In implementations, the PSU-specific data is supplied by the PSU 406 via a communication interface (e.g., a Universal Serial Bus controller or Surflink communication interface). In implementations, the PSU-specific data is used to determine a predefined range of SPLs and/or a predefined PSP range (e.g., the predefined range of SPLs 393 and/or the predefined PSP range 392).

In implementations, the power system data exchanged between the power control system 420 and elements of the electronic device 402 include reliability data parameters and/or values thereof. In implementations, reliability data parameters include one or more of temperature data (e.g., a temperature of one or more of a surface of the electronic device, a component of the electronic device 402, the energy storage device 412, the PSU 406, of the ambient environment, and the like), errors or flags raised by systems of the electronic device 402, reliability power limits (e.g., for one or more of the hardware elements 421, the energy storage device 412, the electronic device 402, and the PSU 406), and detected transients in current or voltage (e.g., between the PSU 406 and the charger 410 or between internal elements of the electronic device 402).

In implementations, the power system data exchanged with the power control system 420 includes current/voltage data (e.g., current/voltage data parameters and/or values thereof). The current/voltage data parameters represent electric current and/or voltage determinations taken from power couplings between elements of the electronic device 402 and/or the PSU 406. In an implementation, the charger 410 is electronically coupled with hardware elements 421 (e.g., the power control system 420 and other electronic device elements 414) and the energy storage device 412 (e.g., a battery).

In implementations, the power control system 420 exchanges current/voltage data with a PSU current sense 480 and an energy storage current sense 482 either directly or via the charger 410, via different components, or directly with the power control system 420. The data transmitted between the PSU current sense 480 and the power control system 420 includes current/voltage data parameters representing one or more of an electric current and an electric potential or voltage between the PSU 406 and the charger 410. This data may be used to determine derived current/voltage parameter values such as an amount of current and/or the voltage supplied by the PSU 406 to the charger 410. This may indicate to the power control system 420 supplied power provided by the PSU 406 to the charger 410, some or all of which are suppliable (e.g., another current/voltage parameter value) to the hardware elements 421 and the energy storage device 412.

In implementations, the data transmitted between the energy storage current sense 482 and the power control system 420 include data representing one or more of an electric current and an electric potential/voltage between the charger 410 and the energy storage device 412. The data may include current/voltage data parameters and/or values thereof, such as one or more of a direction and a magnitude of the current and/or voltage. The power control system 420 may interpret the data to determine a value of current/voltage parameters and/or values thereof, including a relative state of charge (RSOC) of the energy storage device 412 (e.g., a battery charge level sometimes expressed as a percentage of total energy storage device 412 charge capacity), a charge rate of the energy storage device 412, whether the energy storage device 412 is charging, or whether the energy storage device 412 is discharging. In implementations, the electronic device system 400 may determine, based at least in part on a rate of charging or current supplied to the energy storage device 412, the RSOC of the energy storage device 412. The charge rate or a current rate may be represented as an amount of current passed through the energy storage device 412 divided by a theoretical current draw under which the energy storage device 412 delivers its predefined nominal rated capacity during a period of time (e.g., in an hour). For example, 1C could represent that 5000 milliamps are passed in an hour through a battery rated for 5000 milliamp-hours. Other example values of charge rate include 0.1 C, 0.2 C, 0.3 C, 0.4 C, 0.5 C, 0.6 C, 0.7 C., 0.8 C, and 0.9 C.

In implementations, the power control system 420 may also transmit PSU 406 specification parameters or instructions based on the PSU 406 specification parameters to the charger 410. For example, the power control system 420 may determine and/or transmit to the charger 410 a current, voltage, or SPLthat may be based on the aforementioned specification parameters transmitted between the PSU 406 and the power control system 420.

In implementations, the power system data exchanged with the power control system 420 include performance metric data parameters and/or values thereof representing electronic device system element performance metrics. The performance metric data parameters can include power consumed by the individual hardware elements 421, processing resources used (e.g., registers, threads, cores, cache, and the like being utilized by the electronic device 402), memory resources used (e.g., volatile and/or nonvolatile memory), or embedded systems resources used (e.g., resources used by one or more of a system on chip power system management framework or an embedded power system microcontroller).

The PSU 406 is electrically coupled with a charger 410 in the electronic device 402 and provides supplied power to the electronic device 402. The charger 410 is an element that distributes power between system power consumed by hardware elements 421 and charging power provided to an energy storage device 412. In an implementation, the distribution of power is based on instructions transmitted between the charger 410 and the power control system 420. The portion of the supplied power the PSU 406 consumed by the hardware elements 421 (e.g., separately of power supplied to or consumed by the energy storage device 412) represents consumed system power. Data representing the consumed system power may be communicated between one or more of the power control system 420, the charger 410, and the hardware elements 421. The supplied power remaining after the consumed system power is supplied to and/or consumed by the hardware elements 421 may be allocated to other applications including charging power for charging the energy storage device 412.

In an implementation, the power control system 420 adjusts the operation of the hardware elements 421 to adjust the power consumed by the hardware elements 421. In another implementation, the power control system 420 determines an SPL representing a quantity of consumed system power the power control system 420 allocates (e.g., by throttling electronic device 402 hardware) to hardware elements 421 and adjusts the consumed system power to be less than or equal to the SPL.

Depending on the satisfaction of one or more conditions, the power that the PSU 406 provides to the charger 410 may be strategically distributed according to instructions from the power control system 420. In situations where PINC can occur, the power control system 420 may modify an SPL within a predefined range of SPLs (e.g., the predefined range of SPLs 393). The one or more conditions may include one or more of a charging condition, a reliability condition, a power supply condition, a system power condition, and a plugged-in condition.

In implementations, the power control system 420 determines to adjust one or more of the SPL, a system power (e.g., consumed by the hardware elements 421), and charging power based at least in part on whether a charging condition is satisfied. A charging condition is a condition the satisfaction of which causes the power control system 420 to adjust the distribution of supplied power between hardware elements 421 and the energy storage device 412. Charging conditions may include thresholds or acceptable ranges for charge parameters and/or values thereof. Charge parameters may include elements of the described PSU-specific data, current/voltage data, and/or performance metric data. For example, a charging condition may be based at least in part on a direction and/or magnitude of a communicated current (or voltage) between the charger 410, power control system 420, and the energy storage device 412. As used herein, the term "current communicated" (or voltage communicated) between components means current flowing (or a voltage potential generated) between the components (e.g., in contrast to communicating data regarding the current or voltage). For example, the current may be measured by an energy storage current sense 482 in a circuit between the charger 410 and the energy storage device 412. The direction of the flow of current between the energy storage device 412 and one or more of the charger 410 and the hardware elements 421 may indicate whether the energy storage device 412 is discharging. The magnitude of current communicated may indicate a rate of charge and/or a relative state of charge. In an implementation, a charging condition may be additionally or alternatively based on whether a magnitude of charge of the energy storage device 412 satisfies a state of charge condition. The state of charge condition may be based at least in part on a measured or otherwise determined RSOC of the energy storage device 412. Examples of state of charge conditions include that values of one or more parameters and/or values thereof satisfy a threshold or fall within a predefined range, the parameters including one or more of a rate of charge, a magnitude of the communicated current, a direction of the communicated current, a voltage across the energy storage device 412, and an otherwise measured RSOC.

In implementations, the power control system 420 determines to adjust one or more of the SPL, system power (e.g., consumed by the hardware elements 421), and charging power based at least in part on whether a reliability condition is satisfied. A reliability condition is a condition that is used to protect an electronic device 402 or a user thereof. Reliability conditions and satisfactions thereof may be at least partially based on values of reliability parameters (as described herein) falling within predefined ranges or satisfying predefined thresholds. For example, a reliability condition could include that a surface or skin temperature of the electronic device 402 remains at or below 45° C. In this example of the reliability condition, the power control system 420 may reduce the SPL in response to a surface temperature of the electronic device 402 being above 45° C. In implementations, a reliability condition could include an upper bound rated (or negotiated) power for hardware elements 421 (e.g., over a predefined time duration). Determining whether a reliability condition is satisfied before modifying the SPL may help to ensure that the electronic device 402, 502, the PSU 406, 506, and/or the energy storage device 412, 512 are not damaged and/or may help to ensure that users operating the electronic device 402, 502 are not injured. Reducing SPL may result in the power control system 420 throttling system power provided to one or more of the hardware elements 421.

In implementations, the power control system 420 determines to adjust one or more of the SPL, system power (e.g., consumed by the hardware elements 421), and charging power based at least in part on whether a power supply condition is satisfied. A power supply condition is a condition that is responsive to changes in supplied power provided by the PSU 406 to the electronic device 402. The power supply conditions may be based on one or more of PSU-specific data parameters and current/voltage data parameters and/or values thereof. For example, in an implementation, the satisfaction of a power supply condition could include that a supplied power supplied by a PSU 406 is outside of a predefined range or below a minimum supplied power threshold. In response to the satisfaction, the power control system 420 may determine to adjust SPL to adjust charging power provided to the energy storage device 412 to ensure the electronic device 402 has sufficient resources to operate and to prevent PINC. In another implementation, the power supply condition can include a consideration of elements of a charging condition to determine whether to limit or cut off charging power provided to the energy storage device 412.

In implementations, the power control system 420 determines whether to adjust one or more of the SPL, the system power (e.g., consumed by the hardware elements 421), and charging power based at least in part on whether a system power condition is satisfied. A system power condition represents a condition that accounts for system power utilized by the hardware elements 421. The system power condition can include one or more of a predefined lower bound deliverable power limit (e.g., the PSP_MIN 394), a predefined upper bound deliverable power limit (e.g., the PSP_MAX 396), a predefined range of SPLs (e.g., the predefined range of SPLs 393), a predefined initial magnitude of system power limit (e.g., SPL_TYP 395), and the supplied power provided by the PSU. An example of a system power condition is that a detected or measured system power is greater than or equal to a predefined lower bound deliverable power limit (e.g., PSP_MIN 394) at which the electronic device is strained to provide power both to the electronic device 402 and the hardware elements 421. If the condition is satisfied, it may indicate that the power control system 420 can reset system power limit SPL to be lower than the lower bound deliverable power (e.g., the PSP_MIN 394) to charge the energy storage device 412. In an implementation, the power control system may adaptively and/or dynamically determine an SPL for power delivered to the hardware elements 421. In this implementation, the system power condition may include whether a system power consumed by the hardware elements exceeds a determined SPL. For example, if the system power consumed exceeds the determined SPL, the power control system 420 may adjust power consumed by one or more of the hardware elements 421 to be less than the SPL. The determined SPL may fall within a predefined range of SPLs (e.g., the predefined range of SPLs 393).

In implementations, the power control system 420 determines whether to adjust the SPL based at least in part on whether a plugged-in condition is satisfied. A plugged-in condition is based on whether the PSU 406 is plugged-in to the outlet 404. An example of a plugged-in condition is that the electronic device 402 is determined to not be plugged in. When not electrically coupled with the outlet 404, the electronic device 402 may rely on the energy storage device 412 to supply power to the hardware elements. In this example, when the plugged-in condition is satisfied, the power control system 420 may responsively determine to maintain or modify the SPL. If the electronic device 402 utilizes significant resources to complete a task, the power control system 420 may maintain the level of system power limit SPL to facilitate the completion. If a PSU rating (the upper bound limit for supplied power) is identified as a higher rating (e.g., to the satisfaction of a condition or threshold) than an upper bound of deliverable power limit (e.g., PSP_MAX 396), the power control system 420 may determine to allocate system power limit to closer to 396.

Depending on the satisfaction of one or more of the charging conditions, the reliability condition, the power supply condition, a system power condition, and the plugged-in condition, the power control system 420 may determine to adjust and/or may adjust the SPL that one or more of the hardware elements 421 consume, and the power control system 420 may responsively determine to throttle the system power provided to the one or more of the hardware elements 421.

The power control system 420 may dynamically and/or adaptively determine the SPL to ensure that a PINC condition does not occur. The power control system 420 may determine the SPL based on one or more of power ratings of the electronic device 402 elements (e.g., of the energy storage device 412, the hardware elements 421, the charger 410, and power delivery elements that deliver power to the hardware elements 421), a supplied power (e.g., power supplied by the PSU to the electronic device 402), a predefined PSP range (e.g., PSP range 392), a predefined range of SPLs (e.g., range of SPLs 393), a current load processed by the electronic device 402, satisfaction of a condition (e.g., satisfaction of one or more of a charging condition, a power supply condition, a plugged-in condition, another power system condition, and other conditions described herein).

Figure 5:
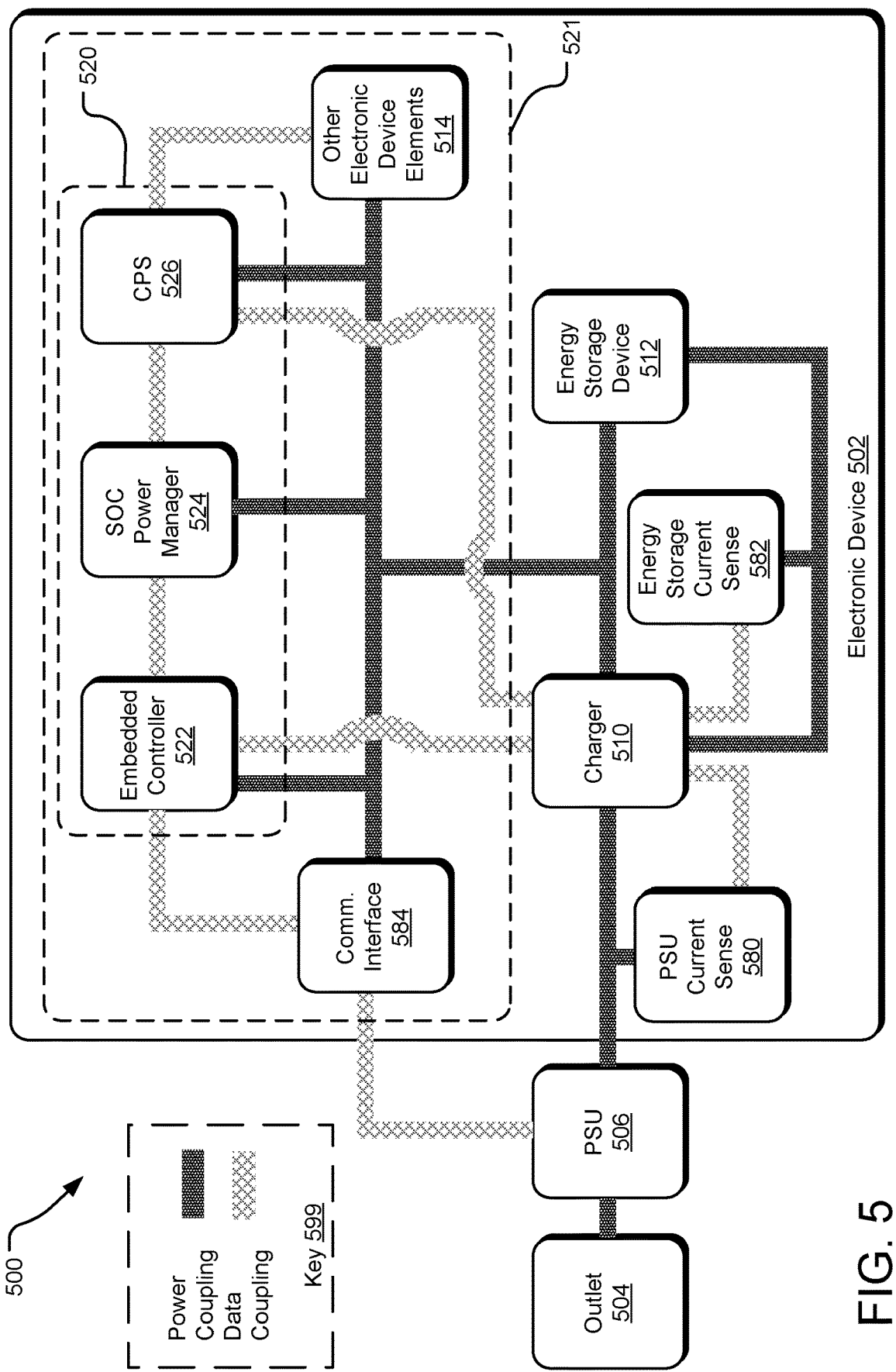
FIG. 5 illustrates another example electronic device system with adaptive power control.

FIG. 5 illustrates another example electronic device system 500 with adaptive power control. In the electronic device system 500, electronic device 502, outlet 504, PSU 506, charger 510, energy storage device 512, power control system 520, hardware elements 521, PSU current sense 580, and energy storage current sense 582 are implementations of electronic device 402, outlet 404, PSU 406, charger 410, energy storage device 412, power control system 420, hardware elements 421, PSU current sense 480, and energy storage current sense 482, respectively. The implementation of electronic device system 500 illustrates specific implementations of the power control system 520 and the hardware elements 521.

In the illustrated implementation, the power control system 520 includes an embedded controller 522, a system-on-chip (SOC) power manager 524, and a core processor system (CPS) 526. The power control system 520 may manage power system data exchanged between the PSU 506, the charger 510, and other electronic device elements 514. Power system data exchanged can include any of the power system data discussed in this specification.

In the illustrated implementation, the embedded controller 522 is an element that communicates data with various hardware elements to control, at least in part, a power distribution of supplied power provided by the PSU 506 between the hardware elements 521 and the energy storage device 512. PSU-specific data may be exchanged between the PSU 506 and the embedded controller 522 (e.g., via an illustrated data communication interface 584). Data representing a PSU limit (e.g., a current, voltage, power limit, or other PSU-specific data) may be transmitted between the embedded controller 522 and the charger 510. Data generated by the PSU current sense 580 and the energy storage current sense 582 representing currents and/or voltages may also be transmitted between the charger 510 and the embedded controller 522. Although the PSU current sense 580 and the energy storage current sense 582 are illustrated as communicatively coupled for sharing data directly with the charger 510, implementations are contemplated in which one or more of the PSU current sense 580 and the energy storage current sense 582 are directly communicatively coupled to the embedded controller 522 or communicatively coupled to the embedded controller 522 via other elements. Although not illustrated, reliability data (e.g., values of reliability parameters such as chassis temperature) may be transmitted between other components (not illustrated) and the embedded controller 522.

In the illustrated implementation, the SOC power manager 524 communicatively couples the CPS 526 and the embedded controller 522 for data sharing. The CPS 526 includes core processing elements of the electronic device 502 (e.g., a central processing unit, a graphics processing unit, and/or an implementation of processor(s) 902), and other processing units available for general electronic device system processing). Implementations are contemplated in which elements of the power control system 520 are differently coupled. The SOC power manager 524 receives, stores, and/or manages data representing reliability limits on reliability parameter values, and this data may be communicated between one or more of the power control system 520 elements. The CPS 526 may receive, store, and/or manage performance metric data. The performance metric data may include values of performance metric parameters (e.g., including limits on available system power, SPLs, and/or limits on available or consumed power supplied to be consumed by or consumed by hardware elements 521). The performance metric data may be exchanged between one or more of the elements of the power control system 520.

Any of the power system data disclosed in this specification may be transmitted between one or more of the charger 510, embedded controller 522, SOC power manager 524, and CPS 526. Based on the data transmitted between the power control system 520 elements and the charger 510, the power control system 520 may determine an adjustment to and/or may adjust one or more of the available system power, an SPL, a supplied power, and a charging power.

Referring to FIGS. 4 and 5, in implementations, elements of the electronic device 402, 502 may facilitate adaptive power control when the electronic device is plugged-in. For example, one or more elements of the power control system 420, 520 may determine whether current communicated between a charger 410, 510 of the electronic device 402, 502 and an energy storage device 412, 512 satisfies a charging condition, where the charging condition is based at least in part on one or more of a direction of the current communicated and a magnitude of the current communicated. Using current communicated as an indicator of whether a charge rate for an energy storage device 412, 512 satisfies a charging condition may provide a direct indication of whether PINC is occurring when the electronic device 402, 502 is plugged into an external power source (e.g., into the outlet 404, 504 via the PSU 406, 506).

In implementations, the power control system 420, 520 determines whether consumed system power consumed by the hardware elements 421, 521 satisfies a system power condition based on a determined system power limit, where the system power limit is a limit on power to be provided to one or more of the hardware elements 421, 521 of the electronic device.

In implementations, the power control system 420, 520 adjusts power consumption of the one or more hardware elements of the electronic device 402, 502 to consume a different consumed system power within a predefined range of system power limits, based at least in part on satisfaction of the charging condition and satisfaction of the power supply condition. In implementations, one or more of the consumed system power and the different consumed system power include power discharged from the energy storage device 412, 512.

In an implementation, one or more elements of the power control system 420, 520 determine an SPL representing available system power consumable by the electronic device 402, 502 and adjust power consumption of one or more hardware elements (e.g., one or more of the hardware elements 421, 521) of the electronic device 402, 502 to consume system power that is less than or equal to the SPL, based at least in part on satisfaction of the charging condition. In an implementation, the current communicated is modified based at least in part on the adjustment of power consumption of one or more hardware elements of the electronic device 402, 502 (e.g., one or more of the hardware elements 421, 521). In an implementation, the power control system 420, 520 determines whether to adjust and/or adjusts the power consumption of the one or more hardware elements 421, 521 of the electronic device 402, 502 to limit entire system power to be consumed by the one or more hardware elements 421, 521to be within a predefined range of SPLs, based at least in part on the satisfaction of the charging condition. Therefore, in this example, limiting the power that is currently being allocated to a determined SPL may allow the power control system 420, 520 to provide charging power to the energy storage device 412, 512, mitigating or eliminating the PINC conditions. Further, by determining a predefined range of SPLs and maintaining the SPL within that range adaptively in a real-time environment, more resources of the PSU 406, 506 can be utilized without the occurrence of PINC (e.g., relative to a system in which conservative and/or static power supply limits are set without accounting for the true capabilities of the PSU 406, 506 and/or the hardware in the electronic device 402/502).

In an implementation, the power control system 420, 520 detects whether the electronic device 402, 502 is coupled to an external power source (e.g., outlet 404, 504), wherein the adjustment of power consumption is based at least in part on the detection. PINC occurs when the electronic device 402, 502 is plugged in, so checking whether the electronic device is plugged in can indicate whether PINC occurs. If the electronic device 402, 502 is not plugged-in (or otherwise coupled to an external power source), the electronic device 402, 502 will likely rely on the energy storage device 412, 512 to provide power to the electronic device 402, 502. As such, the charger 410, 510 will not likely provide charging power to the energy storage device. Checking whether the electronic device 402, 502 is plugged in provides the technical benefit that the electronic device 402, 502 can determine whether PINC occurs.

In an implementation, the power control system 420, 520 further determines whether a reliability condition has been satisfied and adjusts the power consumption based at least in part on the satisfaction of the reliability condition, the reliability condition including one or more of an electronic device temperature and an energy storage device temperature. If reliability limits are reached, PINC may not be the primary concern. In this situation, other control systems may be used to mitigate reliability issues as described herein. In an implementation, the charging condition is based at least in part on whether a magnitude of charge of the energy storage device 412, 512 satisfies a fully charged condition. A fully charged condition may include a predefined range of or a threshold amount of relative state of charge of the energy storage device (e.g., an RSOC greater than 95%). If an energy storage device 412, 512 is already charged, the electronic device 402, 502 may determine to limit or stop the supply of charging power to the energy storage device 412, 512. In this scenario, the PINC condition is not problematic and does not need to be corrected. In an implementation, the current communicated is modified based at least in part on the adjustment of the power consumption of one or more hardware elements 421, 521 of the electronic device 402, 502. If the energy storage device 412, 512 is not charging, it may make sense to modify the charge power, which may be facilitated by and/or reflected in a modification to the current communicated.

In an implementation, the power control system 420, 520 further detects whether the energy storage device 412, 512 is discharging based at least in part on the direction of the current communicated, and the adjustment of the power consumption is based at least in part on the detected discharging. The direction of current communicated can indicate whether an energy storage device 412, 512 is discharging. PINC can cause the discharge in certain circumstances, and detecting the discharge can allow the power control system 420, 520 to take responsive action. In an implementation, the adjustment to the power consumption includes modifying the current communicated to maintain a rate of charge to the energy storage device 412, 512 between a predefined minimum charge rate and a predefined maximum charge rate. It may be desirable to maintain a particular rate of charge to satisfy a user's need to go mobile with the electronic device 402, 502. Measuring the energy storage discharge can provide the technical benefit of contributing to a determination by power control system 420, 520 of the electronic device 402, 502 to determine whether PINC occurs.

Figure 6:
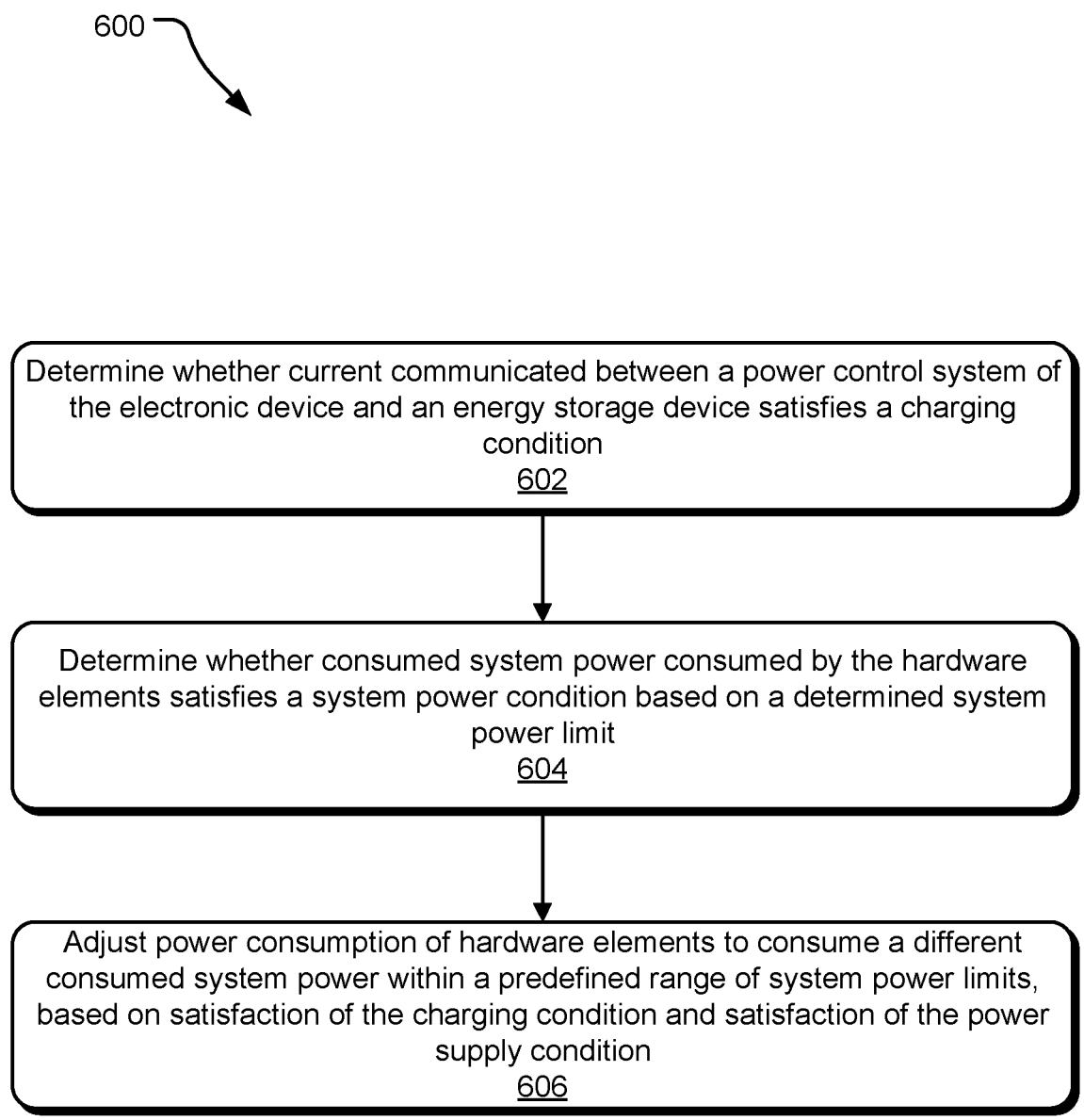
FIG. 6 illustrates example operations for adaptively controlling distribution of power in an electronic device.

FIG. 6 illustrates example operations 600 for adaptively controlling distribution of power in an electronic device. Specifically, determining operation 602 determines whether current communicated between a power control system 420 together with a charger of the electronic device and an energy storage device satisfies a charging condition. In an implementation, the charging condition is based at least in part on one or more of a direction of the averaged current communicated and a magnitude of the average current communicated in a certain sampling rate. In an implementation, the charging condition is additionally or alternatively based at least in part on whether a magnitude of charge of the energy storage device satisfies a fully charged condition. In still another implementation, the charging condition additionally or alternatively includes considering whether the energy storage device is discharging (e.g., over a predefined period). Other implementations of the charging condition are contemplated in described in this specification, and the determining operation 602 may alternatively or additionally determine the satisfaction of the other implementations of the charging condition. In implementations, the determining operation 602 additionally or alternatively determines a satisfaction of one or more of a reliability condition, a power supply condition, a system power condition, and a plugged-in condition (the listed conditions as described in this specification).

For example, in an implementation in which the determining operation 602 determines a satisfaction of the reliability condition, the determining operation 602 the reliability condition includes consideration one or more of an electronic device temperature and an energy storage device temperature. In an implementation in which the determining operation 602 determines a plugged-in condition, the plugged-in condition can be based on whether the electronic device is coupled to an external power source (e.g., an electrical outlet). In an implementation in which the determining operation 602 determines a satisfaction of a system power condition, the condition may include whether the consumed system power satisfies a minimum available system power condition.

Determining operation 604 determines whether consumed system power consumed by the hardware elements satisfies a system power condition based on a determined system power limit (SPL), wherein the SPL is a limit on power to be consumed by the one or more hardware elements of the electronic device. The operations 600 may additionally include a determining operation (not illustrated) to determine the SPL. The determination of the SPL may be based on the satisfaction of one or more conditions described in this specification.

Adjusting operation 606 adjusts power consumption of the one or more hardware elements of the electronic device to consume a different consumed system power within a predefined range of system power limits, based at least in part on satisfaction of the charging condition and satisfaction of the power supply condition.

In various implementations, adjusting the SPL causes an adjustment in the charging power provided by the charger to the energy storage device by modifying power consumed by one or more hardware elements of the electronic device. In other implementations, the charging power is modified additionally or alternatively based on a separate determination by the power control system or the charger (e.g., based on the adjustment to the SPL). The charging power can be modified by modifying the current or voltage provided to the energy storage device.

In various implementations, the consumed system power and the different consumed system power include power discharged from the energy storage device.

In various implementations, the operations 600 further include a determining operation (not illustrated) that determines whether a reliability condition has been satisfied, wherein the operation of adjusting is based at least in part on satisfaction of the reliability condition, the reliability condition including one or more of an electronic device temperature, a predefined power limit of an electronic device component, and an energy storage device temperature.

In various implementations, the charging condition is based at least in part on whether a magnitude of charge of the energy storage device satisfies a fully charged condition.

In various implementations, the current communicated is modified based at least in part on the operation of adjusting the power consumption of the one or more hardware elements of the electronic device.

In various implementations, the operation of adjusting includes modifying the current communicated to maintain a rate of charge to the energy storage device between a predefined minimum charge rate and a predefined maximum charge rate.

Figure 7:
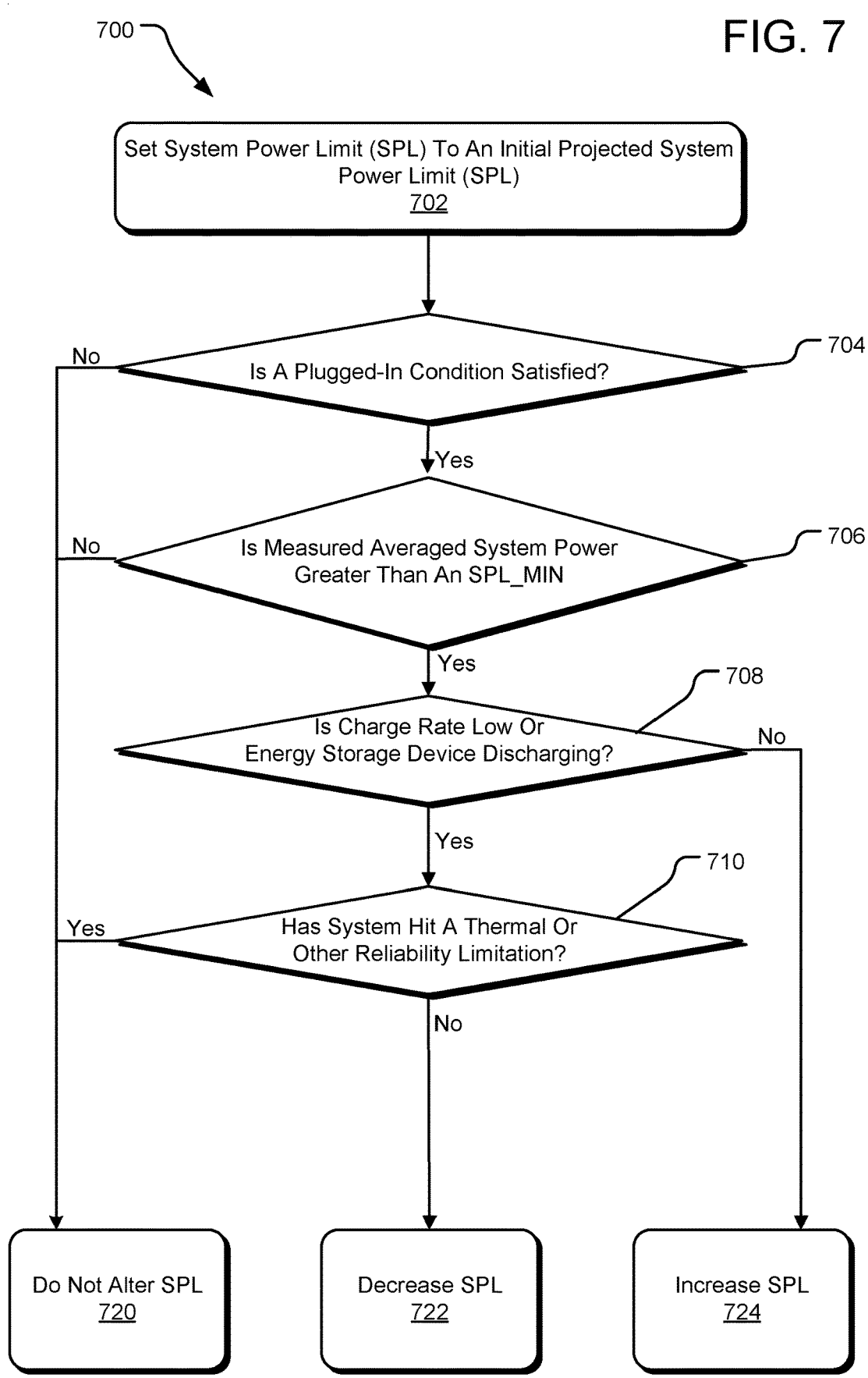
FIG. 7 illustrates other example operations for adaptively controlling distribution of power in an electronic device.

FIG. 7 illustrates other example operations 700 for adaptively controlling distribution of power in an electronic device. Specifically, a setting operation 702 sets a system power limit (SPL) to an initial SPL level (e.g., SPL_TYP 395). The initial SPL level may, at least initially, be a constant value (e.g., one determined when the PSU is negotiated and contracted for a given electronic device system). The power control system may subsequently determine and implement an SPL based on predefined parameters, responsive to adaptive parameters, and/or based on a learned (e.g., by a machine learning algorithm) prior determination (e.g., one established prior to a reboot).

A determining operation 704 determines whether the device is plugged-in. Whether the device is plugged-in may be an element of a plugged-in condition. If the device is plugged in (plugged-in condition satisfied), the operations 700 proceed to a determining operation 706. Otherwise, a maintaining operation 720 does not alter the SPL.

The determining operation 706 determines whether system power is greater than or equal to a predefined lower bound deliverable power limit (i.e., SPL_MIN 397). Whether system power is greater than or equal to a predefined lower bound deliverable power limit (i.e., SPL_MIN 397) may be an element of a system power condition. If the measured averaged system power is greater than or equal to a predefined lower bound deliverable power limit SPL_MIN (system power condition satisfied), then operations 700 proceed to a determining operation 708. Otherwise, maintaining operation 720 does not alter the SPL.

Determining operation 708 determines whether a charge rate is below a predefined charge rate or whether the energy storage device is discharging. Whether a charge rate is below a predefined charge rate or whether the energy storage device is discharging (e.g., rather than charging while plugged in) may be elements of a charging condition. If either a charge rate is below a predefined charge rate or the energy storage device is discharging (charging condition satisfied), operations 700 proceed to a determining operation 710. Otherwise, an increasing operation of 724 increases the SPL.

The determining operation 710 determines whether the system has hit a thermal or another reliability limit. Whether the electronic device system has hit a thermal or another reliability limit may be an element of a reliability condition. If the device system has hit a thermal or another reliability limit (reliability condition satisfied), the maintaining operation 720 does not alter the SPL. Otherwise, a decreasing operation 722 decreases the SPL.

Figure 8:
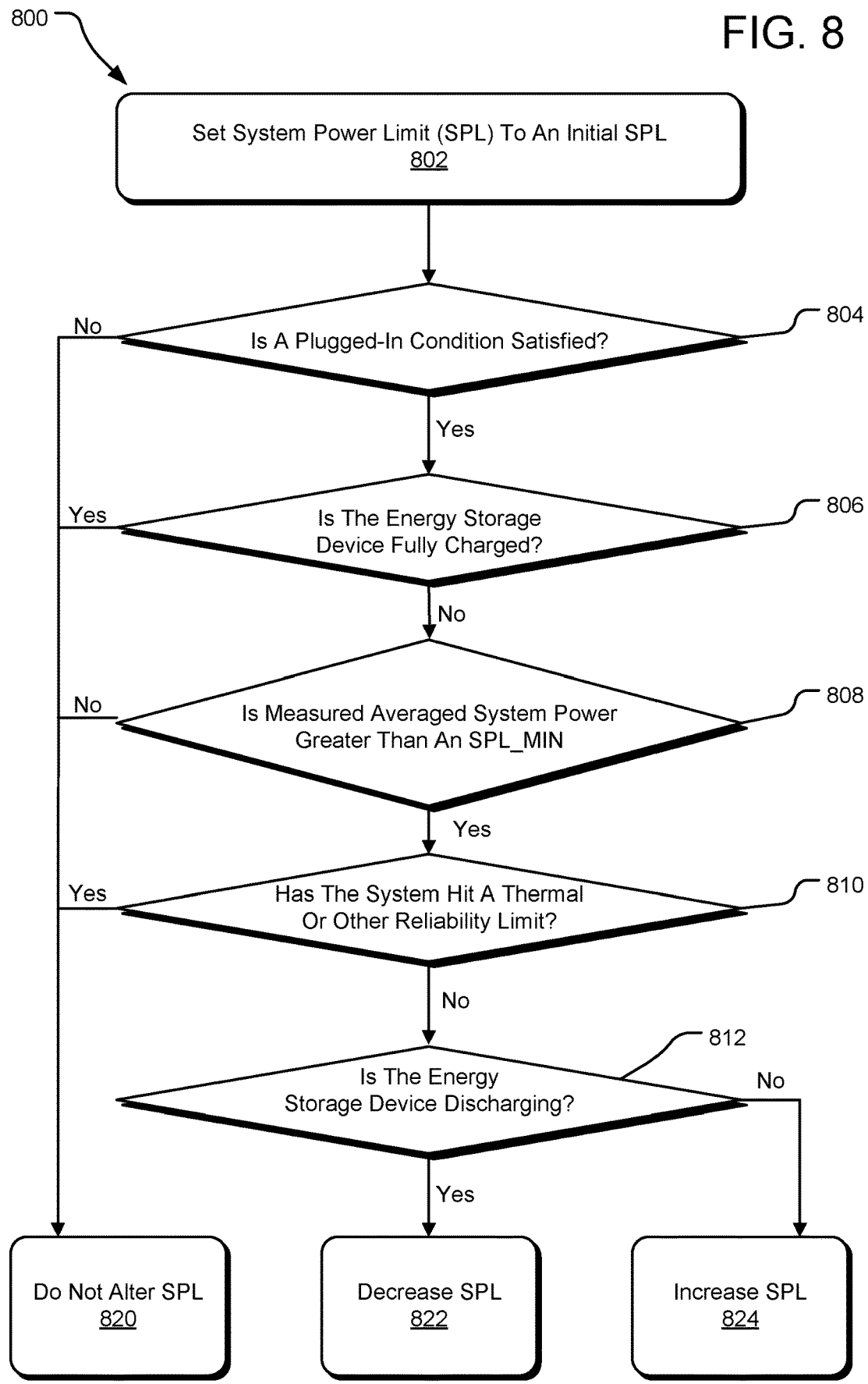
FIG. 8 illustrates still other example operations for adaptively controlling distribution of power in an electronic device.

FIG. 8 illustrates still other example operations 800 for adaptively controlling distribution of power in an electronic device. Specifically, a setting operation 802 sets a system power limit (SPL) to an initial SPL (e.g., SPL_TYP 395). The initial SPL may be a constant value or may be dynamically responsive and/or set to a prior determined (e.g., before a reboot) SPL value.

A determining operation 804 determines whether the device is plugged-in. Whether the device is plugged-in may be an element of a plugged-in condition. If the device is plugged in (plugged-in condition satisfied), the operations 800 proceed to a determining operation 806. Otherwise, a maintaining operation 820 does not alter the SPL.

The determining operation 806 determines whether an energy storage device is fully charged. Whether the energy storage device is fully charged (e.g., within a range of or exceeding a threshold of a relative state of charge) may be an element of a fully charged condition (e.g., a type of charging condition). If the energy storage device is fully charged (the fully charged condition is satisfied), the maintaining operation 820 does not alter the SPL. Otherwise, operations 800 proceed to a determining operation 808.

The determining operation 808 determines whether a consumed system power measurement is greater than or equal to a predefined lower bound deliverable power limit SPL_MIN (e.g., whether measured averaged system power is greater than or equal to a predefined lower bound deliverable power limit SPL_MIN) may be an element of a system power condition. If the consumed system power is greater than or equal to a predefined lower bound deliverable power limit SPL_MIN (system power condition satisfied), then the operations 800 proceed to a determining operation 810. Otherwise, the maintaining operation 820 does not alter the SPL.

Determining operation 810 determines whether the system has hit a thermal or another reliability limit. Whether the electronic device system has hit a thermal or another reliability limit may be an element of a reliability condition. If the device system has hit a thermal or another reliability limit (reliability condition satisfied), operation 820 does not alter the SPL. Otherwise, operations 800 proceed to a determining operation 812.

The determining operation 812 determines whether the energy storage device is discharging. Whether the energy storage device is discharging may be an element of a charging condition. If the energy storage device is discharging (charging condition satisfied), a decreasing operation 822 decreases the SPL. Otherwise, an increasing operation 824 increases the SPL.

Figure 9:
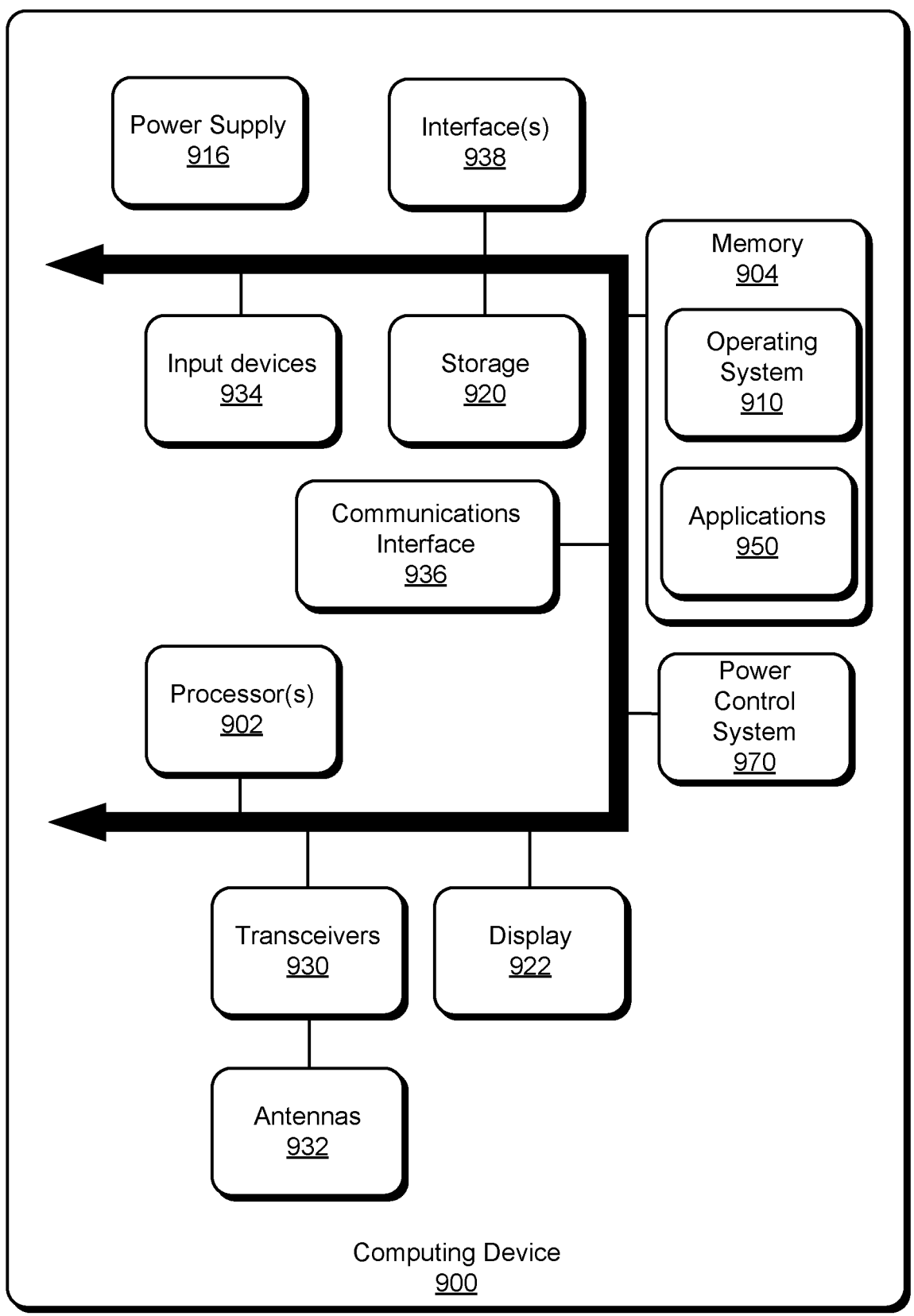
FIG. 9 illustrates an example computing device for implementing the features and operations of the described technology.

FIG. 9 illustrates an example computing device 900 for implementing the features and operations of the described technology. The computing device 900 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 900 may be an implementation of or may be an implementation of a component of an electronic device (e.g., an implementation of one or more of electronic devices 102, 202, 402, and 502).

The computing device 900 includes one or more processor(s) 902 and a memory 904. In an implementation, the processor(s) 902 may include elements of a power control system The memory 904 generally includes both volatile memory (e.g., RAM) and nonvolatile memory (e.g., flash memory). An operating system 910 resides in the memory 904 and is executed by the processor(s) 902.

In an example computing device 900, as shown in FIG. 9, one or more modules or segments, such as applications 950 and/or a power control system module are loaded into the operating system 910 on the memory 904 and/or storage 920 and executed by processor(s) 902.

The storage 920 may include one or more tangible storage media devices and may store a charging condition, a reliability condition, a power supply condition, a system power condition, a plugged-in condition, an available system power, a consumed system power, a supplied power, a charging power adaptive determinations, power system data, PSU-specific data, PSU-specific data parameters and/or values thereof, voltage specifications of the PSU, current specifications of the PSU, power specifications of the PSU, model numbers of the PSU and/or its constituent elements, safety limits of the PSU, reliability data, reliability data parameters and/or values thereof, temperature data (e.g., temperature of one or more of a surface of the electronic device, a component of the electronic device, the energy storage device, the PSU, of the ambient environment, and the like), errors or flags raisable by systems of the electronic device, detected transients in current or voltage, current/voltage data parameters and/or values thereof, electric current and/or voltage determinations, current/voltage data parameters representing one or more of an electric current and an electric potential or voltage between the PSU and the charger and/or values thereof, and/or derived current/voltage parameters and/or values thereof and may be local to the computing device 900 or may be remote and communicatively connected to the computing device 900.

The storage 920 may include one or more tangible storage media devices and may additionally or alternatively store data representing an amount of current and/or the voltage supplied by the PSU to the charger, data representing one or more of an electronic current and an electric potential/voltage between the charger and the energy storage device, data representing one or more of a direction and a magnitude of the current and/or voltage, values of relative state of charge (RSOC) of the energy storage device, data representing a battery charge level expressed as a percentage of total charge capacity, data representing a charge rate of the energy storage device, data representing whether the energy storage device is charging and/or discharging, data representing predefined nominal rated capacity for the energy storage device, performance metric data parameters and values thereof, electronic device system element performance metrics, data representing power consumed by individual hardware elements, data representing processing resources used, data representing memory resources used, data representing embedded systems resources used, and/or instructions from the power control system and may be local to the computing device 900 or may be remote and communicatively connected to the computing device 900.

The storage 920 may include one or more tangible storage media devices and may additionally or alternatively store data representing thresholds or acceptable ranges for values of parameters, data representing a direction and/or magnitude of a communicated current (or voltage) between the charger and the energy storage device, data representing a magnitude of charge of the energy storage device, data representing a RSOC of the energy storage device, data representing a predefined lower bound deliverable power limit (e.g.,. rhe PSP_MIN 394), data representing a predefined upper bound deliverable power limit (e.g., the PSP_MAX 396), data representing a predefined maximum system power limit (e.g., the SPL_MAX 399), data representing a predefined minimum system power limit (e.g., the SPL_MIN 397), data representing a predefined initial magnitude of system power limit (e.g., the SPL_TYP 395), data representing a ideal PSU source power (e.g., the PSU_IDEAL 398), data representing a read measured (e.g., averaged) system power, determined SPLs, prior determined SPLs (e.g., before a reboot), a predefined range of SPLs (e.g., predefined range of SPL 393), a predefined PSP range (e.g., PSP range 392), locally and globally unique identifiers, requests, responses, and/or other data and be local to the computing device 900 or may be remote and communicatively connected to the computing device 900.

The computing device 900 includes a power supply 916, which is powered by one or more batteries (e.g., implementations of energy storage device 412 or 512) or other power sources (e.g., implementations of PSU 106, 206, 406, or 506) and which provides power to other components of the computing device 900 (e.g., implementations of hardware elements 421 or 521). The power supply 916 may also be connected to an external power source (e.g., implementations of the electric outlet 104, 404, or 504) that overrides or recharges the built-in batteries or other power sources.

The computing device 900 may include one or more communication transceivers 930, which may be connected to one or more antenna(s) 932 to provide network connectivity (e.g., mobile phone network, Wi-Fi®, Bluetooth®) to one or more other servers and/or client devices (e.g., mobile devices, desktop computers, or laptop computers). The computing device 900 may further include a communications interface 936 (e.g., a network adapter), which is a type of computing device. The computing device 900 may use the communications interface 936 and any other types of computing devices for establishing connections over a wide-area network (WAN) or local-area network (LAN). It should be appreciated that the network connections shown are examples and that other computing devices and means for establishing a communications link between the computing device 900 and other devices may be used.

The computing device 900 may include one or more input devices 934 such that a user may enter commands and information (e.g., a keyboard or mouse). These and other input devices may be coupled to the server by one or more interfaces 938, such as a serial port interface, parallel port, or universal serial bus (USB). The computing device 900 may further include a display 922, such as a touch screen display.

The computing device 900 may include a power control system 970 (e.g., implementations of power control system 420 or 520). Although illustrated in FIG. 9 as a component separate of the processor(s) 902 and the memory 904, it should be appreciated that implementations are contemplated in which the power control system 970 is partially or completely integrated with the processor(s) 902 and the memory 904 (e.g., implementations where the power control system 970 includes implementations of the CPS 526 or where the power control system 970 is at least partially comprised of dedicated software such as a power control system module).

The computing device 900 may include a variety of tangible processor-readable storage media and intangible processor-readable communication signals. Tangible processor-readable storage can be embodied by any available media that can be accessed by the computing device 900 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information, and which can be accessed by the computing device 900.

In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method of adaptively controlling distribution of power supplied by a charger of an electronic device between an energy storage device of the electronic device and one or more hardware elements of the electronic device while the charger receives input power from an external power source is provided. The method includes determining whether current communicated between the charger of the electronic device and the energy storage device satisfies a charging condition, wherein the charging condition is based at least in part on one or more of a direction of the current communicated and a magnitude of the current communicated, determining whether consumed system power consumed by the hardware elements satisfies a system power condition based at least in part on a determined system power limit, wherein the determined system power limit is a limit on power to be provided to the one or more hardware elements of the electronic device, and adjusting power consumption of the one or more hardware elements of the electronic device to consume a different consumed system power within a predefined range of system power limits, based at least in part on satisfaction of the charging condition and satisfaction of the system power condition.

Another example method of any preceding method is provided, wherein the consumed system power and the different consumed system power include power discharged from the energy storage device.

Another example method of any preceding method is provided, further comprising determining whether a reliability condition has been satisfied, wherein the operation of adjusting is based at least in part on satisfaction of the reliability condition, the reliability condition including one or more of an electronic device temperature, a predefined power limit of an electronic device component, and an energy storage device temperature.

Another example method of any preceding method is provided, wherein the charging condition is based at least in part on whether a magnitude of charge of the energy storage device satisfies a fully charged condition.

Another example method of any preceding method is provided, wherein the current communicated is modified based at least in part on the operation of adjusting the power consumption of the one or more hardware elements of the electronic device.

Another example method of any preceding method is provided, further including determining the determined system power limit based at least in part on the satisfaction of the charging condition.

Another example method of any preceding method is provided, wherein the operation of adjusting includes modifying the current communicated to maintain a rate of charge to the energy storage device between a predefined minimum charge rate and a predefined maximum charge rate.

An example electronic device that adaptively controls distribution of power is provided. The electronic device includes an energy storage device, one or more hardware elements that consume power, a charger adapted to distribute power between the energy storage device and the one or more hardware elements, wherein the charger is electrically coupled to an external power source, an energy storage current sense to determine a current communicated between the charger and the energy storage device, and a power control system. The power control system is configured to determine whether current communicated between the charger of the electronic device and the energy storage device satisfies a charging condition, wherein the charging condition is based at least in part on one or more of a direction of the current communicated and a magnitude of the current communicated, determine whether consumed system power consumed by the hardware elements satisfies a system power condition based at least in part on a determined system power limit, wherein the determined system power limit is a limit on power to be provided to the one or more hardware elements of the electronic device, and adjust power consumption of the one or more hardware elements of the electronic device to consume a different consumed system power within a predefined range of system power limits, based at least in part on satisfaction of the charging condition and satisfaction of the system power condition.

Another example electronic device of any preceding device is provided, wherein the consumed system power and the different consumed system power include power discharged from the energy storage device.

Another example electronic device of any preceding device is provided, wherein the power control system is further configured to determine whether a reliability condition has been satisfied, wherein the operation of adjusting is based at least in part on satisfaction of the reliability condition, the reliability condition including one or more of an electronic device temperature and an energy storage device temperature.

Another example electronic device of any preceding device is provided, wherein the charging condition is based at least in part on whether a magnitude of charge of the energy storage device satisfies a fully charged condition.

Another example electronic device of any preceding device is provided, wherein the current communicated is modified based at least in part on the adjustment of the power consumption of the one or more hardware elements of the electronic device.

Another example electronic device of any preceding device is provided, wherein the power control system is further configured to determine the determined system power limit based at least in part on the satisfaction of the charging condition.

Another example electronic device of any preceding device is provided, wherein the adjustment of power consumption includes modifying the current communicated to maintain a rate of charge to the energy storage device between a predefined minimum charge rate and a predefined maximum charge rate.

One or more example tangible processor-readable storage media embodied with instructions for executing on one or more processors and circuits of an electronic device a process is provided. The process includes determining whether current communicated between a charger of the electronic device and an energy storage device satisfies a charging condition, wherein the charging condition is based at least in part on one or more of a direction of the current communicated and a magnitude of the current communicated, determining whether consumed system power consumed by one or more hardware elements of the electronic device satisfies a system power condition based at least in part on a determined system power limit, wherein the determined system power limit is a limit on power to be provided to the one or more hardware elements of the electronic device, and adjusting power consumption of the one or more hardware elements of the electronic device to consume a different consumed system power within a predefined range of system power limits, based at least in part on satisfaction of the charging condition and satisfaction of the system power condition.

One or more other example tangible processor-readable storage media of any preceding media is provided, wherein the consumed system power and the different consumed system power include power discharged from the energy storage device.

One or more other example tangible processor-readable storage media of any preceding media is provided, wherein the process further includes determining whether a reliability condition has been satisfied, wherein the adjustment of the power consumption is based at least in part on satisfaction of the reliability condition, the reliability condition including one or more of an electronic device temperature and an energy storage device temperature.

One or more other example tangible processor-readable storage media of any preceding media is provided, wherein the process further includes determining the determined system power limit based at least in part on the satisfaction of the charging condition wherein the charging condition is based at least in part on whether a magnitude of charge of the energy storage device satisfies a fully charged condition.

One or more other example tangible processor-readable storage media of any preceding media is provided, wherein the current communicated is modified based at least in part on the adjustment of the power consumption of the one or more hardware elements of the electronic device.

One or more other example tangible processor-readable storage media of any preceding media is provided, wherein the adjustment of power consumption includes modifying the current communicated to maintain a rate of charge to the energy storage device between a predefined minimum charge rate and a predefined maximum charge rate.

An example system for adaptively controlling distribution of power supplied by a charger of an electronic device between an energy storage device of the electronic device and one or more hardware elements of the electronic device while the charger receives input power from an external power source is provided. The system includes means for determining whether current communicated between the charger of the electronic device and the energy storage device satisfies a charging condition, wherein the charging condition is based at least in part on one or more of a direction of the current communicated and a magnitude of the current communicated, means for determining whether consumed system power consumed by the hardware elements satisfies a system power condition based at least in part on a determined system power limit, wherein the determined system power limit is a limit on power to be provided to the one or more hardware elements of the electronic device, and means for adjusting power consumption of the one or more hardware elements of the electronic device to consume a different consumed system power within a predefined range of system power limits, based at least in part on satisfaction of the charging condition and satisfaction of the system power condition.

Another example system of any preceding system is provided, wherein the consumed system power and the different consumed system power include power discharged from the energy storage device.

Another example system of any preceding system is provided, further comprising means for determining whether a reliability condition has been satisfied, wherein the adjustment is based at least in part on satisfaction of the reliability condition, the reliability condition including one or more of an electronic device temperature, a predefined power limit of an electronic device component, and an energy storage device temperature.

Another example system of any preceding system is provided, wherein the charging condition is based at least in part on whether a magnitude of charge of the energy storage device satisfies a fully charged condition.

Another example method of any preceding method is provided, wherein the current communicated is modified based at least in part on the operation of adjusting the power consumption of the one or more hardware elements of the electronic device.

Another example system of any preceding system is provided, further including means for determining the determined system power limit based at least in part on the satisfaction of the charging condition.

Another example system of any preceding system is provided, wherein the means for adjusting includes means for modifying the current communicated to maintain a rate of charge to the energy storage device between a predefined minimum charge rate and a predefined maximum charge rate.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

What is claimed is:

1. A method of balancing distribution of power received by a charger in an electronic device from an external power source and distributing the power by the charger between an energy storage device in the electronic device and one or more hardware elements in the electronic device to satisfy a charging condition, the method comprising:
measuring current communicated between the charger and the energy storage device including measuring one or more of a direction of the current and a magnitude of the current;
determining whether the measured current satisfies the charging condition based at least in part on one or more of the direction of the current and the magnitude of the current, wherein satisfaction of the charging condition indicates a threshold charging state of the energy storage device;
determining whether consumed system power consumed by the one or more hardware elements satisfies system power limits specifying an upper bound defining a maximum power level provided by the charger to the one or more hardware elements and specifying lower bound defining a minimum power level provided by the charger to the one or more hardware elements, wherein the upper bound and lower bound specified by the system power limits are set to maintain a rate of charge to the energy storage device that satisfies the charging condition; and
adjusting, by the charger, power consumption of the one or more hardware elements to consume a different consumed system power within the upper bound and the lower bound to provide sufficient charging power to charge the energy storage device within a predefined range of charge rates, based at least in part on satisfaction of the charging condition.

2. The method of claim 1, wherein the consumed system power and the different consumed system power include power discharged from the energy storage device.

3. The method of claim 1, further comprising:
determining whether a reliability condition has been satisfied, wherein the operation of adjusting is based at least in part on satisfaction of the reliability condition, the reliability condition including one or more of an electronic device temperature, a predefined power limit of an electronic device component, and an energy storage device temperature.

4. The method of claim 1, wherein the charging condition is based at least in part on whether a magnitude of charge of the energy storage device satisfies a fully charged condition.

5. The method of claim 1, wherein the current communicated is modified based at least in part on the operation of adjusting the power consumption of the one or more hardware elements.

6. The method of claim 1, further comprising:
determining the system power limits based at least in part on the satisfaction of the charging condition.

7. The method of claim 1, wherein the operation of adjusting includes modifying the current communicated between the charger and the energy storage device to maintain a rate of charge to the energy storage device between a predefined minimum charge rate and a predefined maximum charge rate.

8. The method of claim 1, wherein the satisfaction of the charging condition is based on current measured as flowing to or from the energy storage device.

9. The method of claim 1, wherein adjusting the power consumption is further based on whether the charger is determined to be receiving power from the external power source.

10. The method of claim 1, wherein the system power limits are within a predefined range of system lower limits that is different than a predefined electronic device power source provision range, and the predefined electronic device power source provision range represents a range of variability that exists in power supplied by the external power source.

11. The method of claim 1, wherein the charger distributes the power based on instructions transmitted between the charger and a power control system of the electronic device.

12. The method of claim 1, wherein determining that the measured current satisfies the charging condition indicates that the energy storage device is charging below a predefined rate.

13. An electronic device that balances distribution of power to satisfy a charging condition, comprising:
an energy storage device;
one or more hardware elements that consume power;
a charger in the electronic device adapted to receive power from an external power source and to distribute the power between the energy storage device and the one or more hardware elements, wherein the charger is electrically coupled to the external power source;
an energy storage current sense to measure a current communicated between the charger and the energy storage device including measuring one or more of a direction of the current and a magnitude of the current; and
a power control system configured to:
determine whether the measured current communicated between the charger and the energy storage device satisfies a charging condition based at least in part on one or more of the direction of the current and the magnitude of the current, wherein satisfaction of the charging condition indicates a threshold charging state of the energy storage device;
determine whether consumed system power consumed by the one or more hardware elements satisfies system power limits specifying an upper bound defining a maximum power level of the power provided by the charger to the one or more hardware elements and specifying a lower bound defining a minimum power level of the power provided by the charger to the one or more hardware elements, wherein the upper bound and lower bound specified by the system power limits are set to maintain a rate of charge to the energy storage device that satisfies the charging condition; and
wherein the charger is further configured to adjust power consumption of the one or more hardware elements to consume a different consumed system power within the upper bound and the lower bound to provide sufficient charging power to charge the energy storage device within a predefined range of charge rates, based at least in part on satisfaction of the charging condition.

14. The electronic device of claim 13, wherein the consumed system power and the different consumed system power include power discharged from the energy storage device.

15. The electronic device of claim 13, wherein the power control system is further configured to:
determine whether a reliability condition has been satisfied, wherein the operation of adjusting is based at least in part on satisfaction of the reliability condition, the reliability condition including one or more of an electronic device temperature and an energy storage device temperature.

16. The electronic device of claim 13, wherein the charging condition is based at least in part on whether a magnitude of charge of the energy storage device satisfies a fully charged condition.

17. The electronic device of claim 13, wherein the current communicated is modified based at least in part on the adjustment of the power consumption of the one or more hardware elements.

18. The electronic device of claim 13, wherein the power control system is further configured to:
determine the system power limits based at least in part on the satisfaction of the charging condition.

19. The electronic device of claim 13, wherein the adjustment of power consumption includes modifying the current communicated between the charger and the energy storage device to maintain a rate of charge to the energy storage device between a predefined minimum charge rate and a predefined maximum charge rate.

20. One or more tangible processor-readable storage media embodied with instructions for executing on one or more processors and circuits of an electronic device a process for balancing distribution of power received by a charger in an electronic device from an external power source and distributing the power by the charger between an energy storage device in the electronic device and one or more hardware elements in the electronic device to satisfy a charging condition, the process comprising:
measuring a current communicated between the charger in the electronic device and the energy storage device including measuring a direction of the current and a magnitude of the current;
determining whether the measured current satisfies a charging condition based at least in part on one or more of the direction of the current and the magnitude of the current, wherein satisfaction of the charging condition indicates a threshold charging state of the energy storage device;
determining whether consumed system power consumed by one or more hardware elements in the electronic device satisfies a system power condition based at least in part on a determined system power limits, wherein the determined system power limits specifying an upper bound of the determined system power limits defining a maximum power level of the power provided by the charger to the one or more hardware elements and specifying a lower bound defining a minimum power level of the power provided to the one or more hardware elements, wherein the upper bound and lower bound specified by the system power limits are set to maintain a rate of charge to the energy storage device that satisfies the charging condition; and
adjusting, by the charger, power consumption of the one or more hardware elements to consume a different consumed system power within the upper bound and the lower bound to provide sufficient charging power to charge the energy storage device within a predefined range of charge rates, based at least in part on satisfaction of the charging condition.

21. The one or more tangible processor-readable storage media of claim 20, wherein the consumed system power and the different consumed system power include power discharged from the energy storage device.

22. The one or more tangible processor-readable storage media of claim 20, the process further comprising:
determining whether a reliability condition has been satisfied, wherein the adjustment of the power consumption is based at least in part on satisfaction of the reliability condition, the reliability condition including one or more of an electronic device temperature and an energy storage device temperature.

23. The one or more tangible processor-readable storage media of claim 20, the process further comprising:
determining the system power limits based at least in part on the satisfaction of the charging condition wherein the charging condition is based at least in part on whether a magnitude of charge of the energy storage device satisfies a fully charged condition.

24. The one or more tangible processor-readable storage media of claim 20, wherein the current communicated is modified based at least in part on the adjustment of the power consumption of the one or more hardware elements.

25. The one or more tangible processor-readable storage media of claim 20, wherein the adjustment of power consumption includes modifying the current communicated between the charger and the energy storage device to maintain a rate of charge to the energy storage device between a predefined minimum charge rate and a predefined maximum charge rate.

* * * * *